United States Patent [19]

Burke, Jr. et al.

[11] 3,873,584

[45] Mar. 25, 1975

[54] HYDROXYL CONTAINING UNSATURATED DRYING OIL POLYMERS AND PROCESSES FOR PREPARING POLYMERS

[75] Inventors: Oliver W. Burke, Jr., 1510 S.W. 13th Ct., Ft. Lauderdale, Fla.; Joseph Austin A. Kizer, Pompano Beach, Fla.; Pauls Davis, Gibralter, Mich.

[73] Assignee: said Burke, by said Kizer and Davis

[22] Filed: May 3, 1973

[21] Appl. No.: 356,722

Related U.S. Application Data

[63] Continuation-in-part of Ser. No. 318,910, Dec. 27, 1972, abandoned, which is a continuation-in-part of Ser. No. 860,163, Sept. 9, 1969, abandoned, which is a continuation-in-part of Ser. No. 594,947, Nov. 16, 1966, abandoned, which is a continuation-in-part of Ser. No. 447,530, April 12, 1965, abandoned, which is a continuation-in-part of Ser. No. 863,218, Dec. 31, 1959, abandoned.

[52] U.S. Cl. ......... 260/407, 260/23 CP, 260/23 ST, 260/23.5 R, 260/23.7 A
[51] Int. Cl. ...................... C08f 19/14, C08f 21/04
[58] Field of Search ............ 260/407, 23 ST, 23 CP

[56] References Cited
UNITED STATES PATENTS

| | | | |
|---|---|---|---|
| 2,401,769 | 6/1946 | Mighton | 260/23 |
| 2,509,495 | 5/1950 | Hammond | 260/407 |
| 2,568,426 | 9/1951 | Whetstone et al. | 260/23 |

*Primary Examiner*—Donald G. Daus
*Assistant Examiner*—Diana G. Rivers
*Attorney, Agent, or Firm*—Hall & Houghton

[57] ABSTRACT

New products are provided which are unsaturated interpolymers of low molecular weight of not over about 10,000, and which contain hydroxyl groups, these new products being the reaction products of from about 5 to 95 parts by weight of conjugated diene and/or vinylidene monomers containing not over 14 carbon atoms and about 95-5 weight parts drying oils, or air blown or bodied drying oils, or the fatty acids therefrom, or dimers, trimers or tetramers thereof, or their mixtures.

A new process is provided for preparing such new products by combining in a single homogeneous phase suitable proportions of the selected monomer material and drying oil substance, aqueous hydrogen peroxide, and selected liquid organic mutual solvent-diluent therefor, and heating the combination to sufficient temperatures between 100°C.–200°C. for a sufficient time to form the new product.

12 Claims, No Drawings

HYDROXYL CONTAINING UNSATURATED DRYING OIL POLYMERS AND PROCESSES FOR PREPARING POLYMERS

CROSS REFERENCE TO RELATED APPLICATIONS

This application is a continuation-in-part of application Ser. No. 318,910 filed Dec. 27, 1972, now abandoned, as a continuation-in-part of application Ser. No. 860,163 filed Sept. 9, 1969, now abandoned, as a continuation of application Ser. No. 594,947 (now abandoned), which was filed Nov. 16, 1966 as a continuation of application Ser. No. 447,530 (now abandoned), which was filed Apr. 12, 1965 as a continuation-in-part of our application Ser. No. 863,218 filed Dec. 31, 1959 (now abandoned), the disclosures of each of which are incorporated herein by reference.

INTRODUCTION AND GENERAL OBJECTS

The invention herein disclosed relates to the production of polymers; especially low molecular weight polymers, comprising essentially polymerized ethylenically unsaturated monomer material together with from 5 to 95 percent drying oil substance and aims generally to improve the same. More particularly the invention aims to provide improved polymer products of this nature, and particularly those containing drying oil substance, and improved processes for the production thereof. (Group Art Unit 144)

Thus one object of the invention is to provide drying oil polymers of this class which have number average molecular weights in the range of from 500 to 10,000.

Another object is to provide polymers of this class which are essentially free of obnoxious odors.

Another object is to provide polymers of this class which contain controlled oxygen content and hydroxyl functionality.

Another object is to provide a process for effecting polymerization of monomer material with 5-95 percent drying oil to form improved polymers having one or more of the above enumerated characteristics.

And another object is to provide processes for effecting such polymerization in a single phase system employing a unique catalyst and solvent combination, which contributes to the attaining of the foregoing objects.

Other and further objects and advantages of the invention will become apparent from the following description and examples of preferred embodiments thereof.

The invention resides in the novel features of the products and processes herein disclosed and is more particularly defined in the appended claims.

For ease of reference the present description is indexed by sub-heads and catch-lines which, however, are not to be regarded as limiting the invention in any way.

SPECIAL AIMS AND UTILITIES

The present invention in one aspect achieves various of the foregoing objects by initiating single phase polymerization at temperatures above 100°C., preferably above 110°C., of monomer material and drying oil substances, employing combined catalyst, modifier, and mutual solvent establishing the single phase, a solution of hydrogen peroxide in liquid organic mutual solvent-diluent for said hydrogen peroxide, monomer material, drying oil substance and any water present therewith, which comprises at least one compound which contains at least one group selected from the class consisting of carbinol, keto and ether groups and combinations thereof.

By this process (1) the invention achieves polymerization to produce the improved polymers at adequate and controllable rates of polymerization. It also (2) achieves the productions of improved polymers having controlled number average molecular weights in the range of 500 to 10,000. It also (3) provides for the production of improved polymers from proportions of drying oil and monomer material wherein the drying oil comprises from 5 percent to 95 percent of the total weight. It also (4) may provide the improved polymers as polymers of high clarity and desired color properties from drying oil substances together with conjugated diene monomer material and/or vinylidene monomer material or other monomer material having polymerizable

groups. It also (5) provides new polymers characterized by the fact that their groups, except for the great bulk of polymerized monomer material and drying oil substance therein, are essentially derived from the solution of hydrogen peroxide in the mutual solvent-diluent. It also (6) provides other new and useful improvements which will be apparent from the following general and detailed descriptions of illustrative embodiments of the invention.

The new polymers herein disclosed are useful as resin and/or binder components in protective and decorative coatings and for other purposes for which low molecular weight polymers of the class described are desired.

GENERAL DESCRIPTION

The crux of the present invention resides in the polymerization of (A) selected monomer material having at least one

bond including vinylidene and/or diene monomers, together with selected drying oil substance, by the formation of a homogeneous system by combining (B) hydrogen peroxide and (C) mutual solvent-diluent for the hydrogen peroxide, the material of (A), and any water present, which thus renders the combination of (B) and (C) soluble in the materials (A) in a single phase in proportions appropriate to promote adequately rapid but controllable polymerization of the selected material (A), at elevated temperatures above 100°C. preferably 110°C. to about 200°C., to form a polymer product having a number average molecular weight which lies in the range of from about 500 to about 10,000; and in the controlled molecular weight polymers so produced having groups which, except for the polymerized monomer material and drying oil substance therein, are oxygen containing groups essentially derived from the solution of hydrogen peroxide in the mutual solvent-diluent.

The most suitable mutual solvent-diluents are those selected from the alcohols, alcohol-ketones, alcohol-ethers, and alcohol-esters which contain not more than six carbon atoms.

Also employed as mutual solvent-diluents, in addition to those which are miscible in water in all proportions, are (1) those materials of the class described which are miscible with water only in limited proportions, but sufficiently so to produce a single phase of the ingredients; (2) those materials of the class described which are miscible with water in at least such limited proportions in combination with essentially non-water miscible diluent in such proportions as to render the combination a mutual solvent-diluent; and (3) azeotropic mixtures of the foregoing which are advantageous for recovery purposes.

At elevated temperatures, i.e., above 100°C. and especially above 110°C. with aqueous hydrogen peroxide per se, certain of the mutual solvent-diluents are apt to be oxidized.

Unpredictably, it has been found according to this invention that in the presence of the polymerizable monomer material hereof, such oxidative processes assume a minor role and polymerization of the monomer material proceeds to satisfactory degrees of conversion in reasonable periods of time which may be considerably in excess of the time ordinarily required for such oxidation reactions at similarly elevated temperatures.

In one aspect of the present invention, polymers, especially in the above indicated molecular weights range, are produced from drying oil substances and monomer material, e.g., butadiene, in which aqueous hydrogen peroxide is virtually insoluble. If the monomer material is merely mixed with aqueous hydrogen peroxide then two phases result constituting a a two phase interfacial polymerization system which produces at the interface a small amount of a different, high molecular weight product not within the required number average molecular weight range of this invention, or a larger amount of such different polymer if the interfacial area is increased by use of an emulsifier. However, when, in accordance with the present invention, there is combined, with an appropriate amount of hydrogen peroxide, an appropriate proportion of mutual solvent-diluent of the class described, then this combination when added to the monomer and the drying oil substance forms a clear homogenous solution therewith, and at elevated temperatures, e.g. above 100°C., polymerization is initiated which can be controlled to maintain the polymerization at sufficient temperatures to obtain in say 3 to 4 hours a conversion of from about 40 percent to about 100 percent of the monomer to polymer. The product, e.g., from butadiene and drying oil, when freed of unreacted and residual materials, is a clear viscous liquid polymer drying oil composition within the specified molecular weight range which comprises oxygen-containing groups, which groups are derived from the solution of the hydrogen peroxide in the mutual solvent-diluent. Following the same practice with other vinylidene monomers individually or in various combinations, produces similarly novel polymers.

In another aspect of the invention there is employed as mutual solvent-diluent an aqueous azeotropic mixture of the mutual solvent-diluent, with or without additional solvent for either the monomer material and/or the drying oil. The use of aqueous azeotrope facilitates separation and recovery for reuse of the mutual solvent-diluent from the water and polymer.

DEFINITIONS

As used herein, the term "interpolymers" comprises the products produced by batch, continuous or intermittent polymerization in which a single monomer is polymerized in the presence of another polymer material or in which two or more monomers in the absence or presence of other polymer material are at least in part simultaneously, intermittently, or sequentially charged and simultaneously, intermittently, or sequentially polymerized; or in which the interpolymer is formed by a combination of these modes of polymerization; and when the components of an interpolymer are inseparable from one another, because chemically bonded to one another, then the polymer may be referred to as a copolymer, block polymer or graft polymer as the case may be.

As used herein, the term "ethylenically unsaturated monomer" denotes a monomer preferably of not more than 14 carbon atoms and containing and polymerizable through at least one

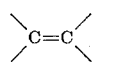

group with the aid of hydrogen peroxide, includes conjugated diene monomers having at least one

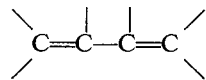

group, but excludes the conjugated and non-conjugated drying oils, modified drying oils, and their fatty acids. The term "vinylidene monomer" denotes an ethylenically unsaturated monomer containing at least one

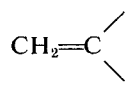

group and includes "vinyl" monomer having at least one $CH_2=CH-$ group but excludes conjugated diene monomers.

The monomers concerned include several categories of monomers, herein differentiated by their relative solubility to water. Since the solvent or solute relationships of hydrogen peroxide and aqueous hydrogen peroxide are relatively similar to those of water, the readily available water values afford a reasonable basis for classification.

As used here the term "monomers virtually insoluble to water" denotes ethylenically unsaturated monomers which at 20°C. do not dissolve more than 1.0 grams of water per 100 grams of monomer and comprises two classes of monomers: (a) the hydrocarbon monomers virtually insoluble to water and (b) the polar monomers virtually insoluble to water.

The "hydrocarbon monomers virtually insoluble to water" include hydrocarbon monomers generally, and comprise, but are not limited to, the typical examples set forth in Table A.

TABLE A

Hydrocarbon Monomers Virtually Insoluble to Water

| Monomer | Solubility of Water in Monomer (1) (% by weight at 20°C.) |
|---|---|
| Hydrocarbon Conjugated Diene Monomers, e.g. | |
| Butadiene-1,3 | 0.06 |
| Isoprene | <0.1 |
| Piperylene | <0.1 |
| Hydrocarbon Vinylidene Monomers, e.g. | |
| Styrene | 0.06 |
| α-methylstyrene | 0.08 |
| Divinylbenzene (50% DVB) | 0.04 |

(1) as reported in literature

The "polar monomers virtually insoluble to water" which include, but are not limited to, the typical examples set forth in Table B, are separately classified because, in addition to carbon and hydrogen, these monomers contain other constituent material selected from the group consisting of oxygen, nitrogen, the halogens, silicon and in some instances sulfur and phosphorous atoms, and combinations of the foregoing.

TABLE B

Polar Monomers Virtually Insoluble to Water

| Monomer | Solubility of Water in Monomer (1) (% by weight at 20°C.) |
|---|---|
| Vinyl chloride | 0.11 (2) |
| Vinylidene chloride | 0.55 (2) |
| Vinyl acetate | 1.0 |
| Vinylidene fluoride | 0.5 |
| Vinyl propionate | 0.60 |
| Vinyl butyrate | 0.3 |
| Vinyl 2-ethylhexoate | 0.2 |
| Vinyl acetylene | 0.67 |
| n-butyl acrylate | 0.7 |
| 2-ethylhexyl acrylate | 0.14 |
| n-phenylmaleic acid | 0.1 |
| 2-ethyl-3-propyl acrylic acid | 0.42 |
| Vinyl methyl ether | 0.38 |
| Vinyl ethyl ether | 0.2 |
| Vinyl butyl ether | 0.09 |
| Vinyl isobutyl ether | 0.08 |
| Triallyl cyanurate | 1.0 |
| 2-chlorobutadiene-1,3 | 1.0 |

(1) as reported in literature
(2) wt. % solubility in water at 25°C.

As used herein the term "monomers substantially insoluble to water" connotes those polar monomers containing carbon, hydrogen, and other constituent material which at 20°C. dissolves over 1.0 grams of water per 100 grams of monomer, but not over 3.5 grams of water per 100 grams of monomer. Such monomers include, but are not limited to the typical examples set forth in Table C.

TABLE C

Monomers Substantially Insoluble to Water

| Monomers | Solubility of Water in Monomers (1) (% by weight at 20°C.) |
|---|---|
| Methacrolein | 1.7 |
| Acrylonitrile | 3.2 |
| Methyl methacrylate | 1.15 |
| Ethyl acrylate | 1.51 |
| Methyl acrylate | 2.32 |
| Vinyl crotonate | 1.1 |
| Isopropenyl acetate | 1.21 |
| Methyl isopropenyl ketone | 3.0 |

(1) as reported in literature

As herein used, the term "monomers essentially insoluble to water" connotes collectively the monomers which are either virtually insoluble to water or substantially insoluble to water as above defined.

The term "monomers soluble to water" as herein used, denotes the polar monomers which are soluble to water to an extent greater than the monomers essentially insoluble to water. Such monomers include, but are not restricted to, the typical examples set forth in Table D.

TABLE D

Polar Monomers Soluble to Water

| Monomers | Solubility (1) (g. monomer/100 g. water) |
|---|---|
| Acrylic acid | sol. water |
| Methacrylic acid | sol. hot water |
| Acrylamide | 204 |
| Maleic acid | 392 |
| Acrolein | 20.8 |

(1) as reported in literature.

The term "drying oils" connotes the unsaturated vegetable oils and the unsaturated fish oils which oils are capable of forming films by oxidation on exposure to air and further includes these oils in their raw state, in bodied form and/or otherwise modified, as by air blowing. The term "drying oil substances" includes (1) the drying oils, especially those containing conjugated unsaturation e.g., tung oil, oiticica oil, isano oil, conjugated linseed oil, conjugated soya bean oils, fish oil, etc., (2) the air blown or bodied drying oils, whether from conjugated or non-conjugated drying oils and whether bodied by heat and/or catalytically, (3) the fatty acids including their dimers, trimers and tetramers derived from such drying or modified drying oils.

The term "hydrogen peroxide" as used herein includes aqueous hydrogen peroxide and comprises several distinct categories or ranges of the latter having different characteristics and utilities as set forth in Table E. For the purposes of this invention categories (b), (c)(1) and (c)(2) in this table constitutes the preferred range, while categories (c)(1) and (c)(2) constitute the more preferred non-hazardous range, and category (c)(1) constitutes the most preferred range.

The hydrogen peroxide employed may be produced by any of the known processes and may contain small amounts of organic or inorganic impurities provided such are not deleterious to the stability of the hydrogen peroxide. The mutual solvent-diluent and hydrogen peroxide when produced by contacting an isoalcohol, e.g., isopropanol with oxygen or air does contain an appreciable quantity of ketone, e.g., acetone and usually a minor amount of carboxylic acid, e.g., acetic acid, which combination has been found effective among the catalyst-mutual solvent systems of this invention.

TABLE E

Categories of Hydrogen Peroxide

| Category | $H_2O_2$ Range (wt. %) | Wt. % $H_2O_2$ | Wt. % $H_2O$ | Moles $H_2O_2$: Moles $H_2O$ | Characteristics | | Utilities |
|---|---|---|---|---|---|---|---|
| (a) | >99 to 80 | ≐100 | ≐0 | ≐1.0:0.0 | Possibly | (a) | Hazardous in presence of organic material when conc. |
| | | >80 | <20 | 1.0:<0.5 | Explosive | | |

TABLE E—Continued

Categories of Hydrogen Peroxide

| Category | $H_2O_2$ Range (wt. %) | Wt. % $H_2O_2$ | Wt. % $H_2O$ | Moles $H_2O_2$: Moles $H_2O$ | Characteristics | | Utilities |
| --- | --- | --- | --- | --- | --- | --- | --- |
| (b) | 80 to 54.2 | 80 | 20 | 1.0 : 0.5 | Range | (b) | Hazardous in presence of organic material where at about stoichiometric proportions |
| | | >54.2 | <45.8 | 1.0 :<1.5 | | | |
| (c)(1) | 54.2 to 48.5 | 54.2 | 45.8 | 1.0 : 1.5 | Non Hazardous | (c) | (1) non-hazardous and highly effective |
| | | 48.5 | 51.5 | 1 : 2 | Preferred | | |
| (c)(2) | <48.5 to 33.1 | <48.5 | >51.5 | 1 :>2 | Range | (c) | (2) non-hazardous and less effective |
| | | 33.1 | 66.9 | 1 : 4 | | | |
| (d)(1) | <33.1 to 15.9 | <33.1 | >66.9 | 1 :>4 | | (d) | (1) not so practical |
| | | 15.9 | 84.1 | 1 : 10 | Less Effective | | |
| (d)(2) | <15.9 to 6.0 | <15.9 | >84.1 | 1 :>10 | Range | (d) | (2) virtually impractical |
| | | 6.0 | 94.0 | 1 : 30 | | | |

As used herein the term "mutual solvent-diluent" denotes liquid organic diluent material which is a sufficient solvent for the drying oil substance and monomer materials employed and also for hydrogen peroxide and any water present, so that in the combination of components employed the drying oil substance, the monomers, the hydrogen peroxide, and the mutual solvent-diluent form a homogeneous solution or single phase containing all said components. In preferred embodiments of this invention, the mutual solvent-diluent is one which is miscible in all proportions with the selected monomer material and drying oil substance, and miscible in all proportions with the hydrogen peroxide. While termed a mutual solvent-diluent herein in accordance with its initial utility, these liquid organic materials assist in the production of controlled molecular weight polymer by the elevated temperature polymerization, and certain categories thereof, e.g., the carboxylic acids augment the hydroxyl functionality of the polymer, while others, especially the water soluble alcohols, are such poor solvents to the polymers produced as to render them readily removable from the polymers. As mutual solvent-diluent may be employed mixtures of mutual solvent-diluents and solvents for either the monomer material or the hydrogen peroxide and such solvent mixtures may be azeotropic mixtures.

GENERAL PROCEDURE

The preferred procedures employed for effecting the polymerizations according to this invention, and which have been used in preparing the examples hereinafter set forth with such modifications as are set forth therein, are as follows:

COMBINING ESSENTIAL INGREDIENTS

The essential ingredients employed in the polymerization recipe are the drying oil substance, the monomer material, the hydrogen peroxide, and the mutual solvent-diluent therefor. As will be appreciated from Table E above, the process of this invention should be carried out so as to avoid having hydrogen peroxide and organic material combined in detonable relation at any time. Accordingly, when hydrogen peroxide is employed in the range of category (a), above 80 to over 99 percent hydrogen peroxide should be diluted by adding to approximately 2 to 3 volumes or more of the mutual solvent-diluent, to prepare a safe solution to combine with the monomer; or be prepared in situ by air oxidation of a secondary alcohol; or be combined in more dilute aqueous solution.

Likewise, in using aqueous hydrogen peroxide of category (b) Table E, while this category is less hazardous, similar precautions are preferably employed.

When the aqueous hydrogen peroxide falls in categories (c)(1) and (c)(2) constituting the preferred range, Table E, it is less critical in what order the essential ingredients are combined. This same comment applies to the more dilute substantially less effective ranges, categories (d)(1) and (d)(2), in the latter of which the presence of excessive water and consequential presence of excessive mutual solvent-diluent can unduly retard the polymerization and/or overburden the polymer recovery operation.

For the most part in the examples, 50 percent by weight aqueous hydrogen peroxide from category (c)(1), Table E, has been employed. While the minimum requirement of mutual solvent-diluent for bringing into single phase the hydrogen peroxide and monomer and drying oil materials to be used can be readily determined merely by combining proportionate parts of the hydrogen peroxide phase and monomer phase and measuring the quantity of mutual solvent-diluent required to be added to convert the two phases to a single phase; for purposes of facilitating control it is preferred to in any event employ at least 5 parts by weight of mutual solvent-diluent for each 100 parts by weight of monomer and drying oil substance to be charged.

The proportions of the hydrogen peroxide to be used should be in the range of 0.5 to 10 parts by weight, preferably 1.0 to 5 parts by weight, and most preferably 2.0 to 4 parts by weight, based on hydrogen peroxide (100 percent) content, per 100 parts by weight of monomer material or monomer material and drying oil substance charged.

ANTIOXIDANTS

The monomers to be polymerized, more particularly described hereinbefore and hereinafter, can be charged free of stabilizer and/or antioxidants. In the examples of preparation of polybutadiene according to this invention, the monomers are distilled and hence freed of stabilizer. In examples employing isoprene and/or piperylene and/or vinylene monomers, however, the monomers used in the examples were not freed of stabilizers. Thus the invention may be practiced either in the presence or the absence of stabilizers, antioxidants or inhibitors.

NON-MUTUAL SOLVENT-DILUENTS, AND MODIFIERS

Similarly, monomers may be employed which are not completely pure and which may contain substantial quantities of non-polymerizable organic material, and such material may constitute either a mutual solvent-diluent or may be a non-mutual solvent-diluent in which event the quantity of mutual solvent-diluent to be employed may be reduced or increased to assure proper balance of the systems. In like manner, when desired non-mutual solvent-diluents for either the monomer or the aqueous hydrogen peroxide, or both, may be employed, to facilitate the process or aid in controlling the molecular weight. Thus the invention may be practiced in the presence or absence of non-mutual solvent-diluents.

Further to aid in controlling molecular weights when desired, in addition to increasing the polymerization temperature, increased quantities of hydrogen peroxide may be employed, and/or modifiers may be added.

To minimize decomposition of hydrogen peroxide in constructing the reactor system for use in the present process, only materials which do not appreciably decompose hydrogen peroxide should be used, such as glass, ceramic ware, tin, aluminum or stainless steel (e.g., "300 type" stainless steel). Thus the inner surface of the reaction vessel is preferably constructed of or lined with aluminum, an aluminum alloy, tin, stainless steel, glass, enamel, procelain or like predominatly silicious material or coated with a resin or other material in contact with which hydrogen peroxide is relatively stable. The inner surface of the reactor, when composed of glass or like silicious material, may be treated with a suitable compound of boron, such as boric acid, or the inner surface may be an acidic enamel. Where the reaction vessel is constructed of or lined with stainless steel, or aluminum, it is desirable to passivate the equipment by known methods, e.g., new equipment of stainless steel may be and preferably is thoroughly cleaned and then passivated by treatment with a strong volatile oxidizing agent, preferably hot 15 to 50 percent by weight nitric acid and hot 30 to 60 percent aqueous hydrogen peroxide in succession.

To further inhibit the decomposition of hydrogen peroxide during the polymerization reaction there may be included in the recipes hereof in minor amounts one or more hydrogen peroxide stabilizers. The hydrogen peroxide stabilizers that are employed in accordance with the invention all are compounds that sequester, that is segregate, abstract, withdraw or envelope, substances that tend to catalyze the decomposition of hydrogen peroxide to water and oxygen, particularly ions of heavy metals, such as the ferric, the cupric, and the chromic ion. As stabilizers there may be used, for example, any known organic hydrogen peroxide stabilizers which will not unduely contaminate the products such as cyanides, alphahydroxy-quinoline, acetanilide, benzoic acid, alphabenzoyloxy-beta-dimethylamino-butyric acid, glycerine phenyl ether, thiourea, sodium salicylate, thymol, gum arabic, albumin, uric acid, guaiacol, phosphatides, acetylglycol, monoacetyl glycol ether, sodium benzene sulfonate, hexamethylene-tetramine, and others, as well as such inorganic hydrogen peroxide stabilizers as oxy acids of phosphorous and their salts, such as trisodium orthophosphate, disodium monohydrogen orthophosphate, monosodium dihydrogen orthophosphate, orthophosphoric acid, sodium pyrophosphate, potassium pyrophosphate, potassium dihydrogen orthophosphate, sodium hypophosphate, sodium metaphosphate, pyrophosphoric acid and metaphosphoric acid; compounds of tin, antimony, silicon, boron, or aluminum, such as sodium aluminate, sodium silicate, sodium metastannate, alpha-metastannic acid, hydrous antimony oxide, freshly presipitated alumina, freshly precipitated silica, silicic acid hydrosol, hydrous stannic oxide and tin-pyrophosphoric acid compounds.

Sodium borate, borax, boric acid, boric oxide, boric acid esters can also be used as inhibitors herein. Hydrogen peroxide is more stable in acid solutions and therefor acids may be employed to aid in stabilization such as the phosphoric acids, acetic acid, oxalic acid, glutaric acid, p-toluene-sulfonic acid, benzenephosphonic acid, adipic acid, and the like. Acidic salts, such as potassium acid phosphate and sodium acid sulfate, and also buffer mixtures of a plurality of salts or of an acid and a salt, may be employed.

From the foregoing, it will be appreciated that the present invention, in its broader aspects, may be practiced with or without hydrogen peroxide stabilizers.

REACTORS AND ADDITION OF MATERIALS THERETO

The reactor may be a tubular reactor, or a vessel type reactor preferably with agitation and the polymerization may be carried out batchwise, continuously or intermittently.

The hydrogen peroxide may be added at the beginning of the reaction or both at the beginning and during the reaction. The monomer material may be added before, concurrently with or after the other ingredients as above indicated, or even a part of the monomer material may be added after the polymerization has commenced.

MONOMER MATERIAL

The monomer materials employable separately or in various combinations in the practice of the invention comprise, inter alia, conjugated diene monomers and other monomers containing and polymerizable through one or more

groups with the aid of hydrogen peroxide and in addition to tho those mentioned heretofor and in the examples may be selected from the following classes of monomers of which the examples set forth are illustrative; hydrocarbon conjugated dienes such as butadiene-1,3, isoprene, 2,3-dimethylbutadiene-1,4, piperylene, pentadiene-1,3, 2-phenyl-butadiene-1,3, and the like; the polar conjugated dienes such as 1- and 2-cyano-butadiene-1,3, 2-chlorobutadiene-1,3 and the like; (it is to be noted that the term conjugated dienes including whether hydrocarbon or polar excludes conjugated dienes having ester groups and/or carboxyl groups such as found in the drying oils and the fatty acids derived therefrom); the olefin monomers such as ethylene; vinyl, vinylidene and allyl aromatic monomers such as styrene, the vinyl toluenes, the methyl styrenes, the ethyl styrenes, the propyl styrenes, the vinyl biphenyls, the vinyl biphenyl ethers, the vinyl naphthalenes, the $\alpha$ and/or $\beta$ substituted vinyl aromatics such as $\alpha$-methyl styrene, isopropenyl biphenyl, isopropenyl biphenyl oxide and the like; the substituted vinyl, allyl or vinylidene aromatics including the alkyl, phenyl, alkoxy, phenoxy, acetyl, acylamino, isocyanate, carbamide, amido, amino, nitrile, carboxyamido, trifluoromethyl, phosphoro, and halo (F, Cl, Br) substituents including the mono, di, tri, and tetra chloro styrenes, the fluorostyrenes, the chlorovinyl toluenes, the fluorovinyl toluenes, the cyano styrenes and the like monomers; esters of olefinic acids including α and β substituted olefinic acids and including alkyl, alkenyl, aryl, aralkyl esters such as the methyl, ethyl, propyl, butyl, isobutyl, pentyl, hexyl, cyclohexyl, phenyl esters of acrylic, methacrylic, ethacrylic, and the like; and including the α-haloacrylates such as methyl α-chloroacrylate, propyl α-chloroacrylate and the like; the esters of olefinic alcohols with saturated acids, such as allyl, methallyl, crotyl, 1-chloroallyl, 2-chloroallyl, cinnamyl, vinyl, methylvinyl, 1-phenylallyl, butenyl and the like esters of saturated aliphatic and aromatic monobasic acids as vinyl and allyl acetate, isopropenyl acetate, vinyl formate, vinyl- 2-ethyl hexoate, methyl vinyl-acetate, vinyl and allyl propionate, n-butyrate and isopropenyl propionate, isopropenyl butyrate, vinyl and allyl benzoate, and the like; the dialkyl esters of olefinic dicarboxylic acids such as the dialkyl esters and mixed dialkyl esters from such alkyls as methyl, ethyl, propyl, and the like through $C_5$, of the olefinic dicarboxylic acids including maleic, citraconic, itaconic, muconic, glutaconic, fumaric and derivatives of these esters such as diethylchloromaleate and the like; olefinic acid esters of epoxy alcohols, such as 2,3-epoxypropyl methacrylate or acrylate, glycidyl methacrylate, glycidyl acrylate, glycidyl crotonate, benzene vinyl monoepoxide and the reaction products of such with amines, as trimethyl amine and the like; olefinic acid esters of fluoro alcohols such as the α-trifluoromethyl acrylic acid esters such as the methyl or ethyl ester or the ester of prefluoroethanol or the partially fluorinated alcohols, that is the fluoroalkanols such as octafluoropentanol and the like; the olefinic halides, such as vinyl fluoride, vinyl chloride, vinyl bromide, vinylidene fluoride, vinylidene chloride, allyl fluoride, allyl chloride, α-methallyl fluoride, α-methallyl chloride, α-ethallyl fluoride or chloride or bromide, tetrafluoroethylene, trifluorochloroethylene, dichloridifluoroethylene, trichlorofluoroethylene, perfluoropropylene, 1-phenyl-1,2 difluoroethylene, trichloroethylene and the like; the alkenyl ketones such as methyl vinyl ketone, isopropenyl methyl ketone, allyl methyl ketone, mesityl oxide, allyl phenyl ketone and the like; the olefinic ethers such as vinyl ethyl ether, vinyl butyl ether, vinyl cyclohexyl ether, vinyl phenyl ether, vinyl tolyl ether, vinyl benzyl ether, methyl isopropenyl ether, allyl ethyl ether, methallyl ethyl ether, chloroallyl ethyl ether and the like; the olefinic aldehydes such as acrolein, methacrolein, crotonaldehyde and the like; the amino olefinic ethers such as the amino vinyl ethers including aminoethylvinyl ether, N-ethylaminoethylvinyl ether, aminopropylvinyl ether, N-methylaminoethylvinyl ether, N,N-diethylaminoethylvinyl ether and the like; the olefinic amines, such allyl amines as N,N-dimethyl allylamine, N,N-diethyl, dipropyl, dibutyl, diisobutyl, diphenyl and similar allylamines and N-allyl morpholine, N-allyl-pyridine, N-allylethyleneimine and the like; nitrogen containing esters of olefinic acids such as aminocyclohexyl methacrylate triethanolamine monomethacrylate, β-piperidyl-N-ethyl methacrylate β-morpholine-N-ethyl methacrylate, N-methacrylyl morpholine, N-methacrylyl thiomorpholine, N-methacrylyl piperidines, N-acrylyl morpholine, N-acrylyl thiomorpholine, N-acrylyl piperidine and the like; the quaternary ammonium monomers, including methacryloxyethyltrimethylammonium methylsulfate and various quaternizing reaction products of quaternizing agents such as alkyl halides, alkyl sulfonates, alkyl phosphates and the like (e.g., methyl bromide and toluene sulfonate) with tertiary amine monomers such as β-dimethylaminoethyl mathacrylate, methyl α-diethyl aminoacrylate, methyl α-(N-methylanilino)-acrylate, methyl α-dibenzylaminoacrylate, methyl α-distearylamino acrylate and the like; the monoolefinic triazine monomers including triazine monomers in which one of the carbons of the triazine ring is attached to a vinyl, allyl, methallyl, crotyl, 1-chloroallyl, 2-chlorallyl, cinnamyl, butenyl radical or the like and the other carbons of the triazine are attached to cyano, halo (F, Cl, Br), amino, alkoxy, cycloaliphatic (e.g., cyclopentyl, cyclohexyl, etc.), aromatic-substituent (e.g., phenyl, biphenyl, naphthyl, etc.), alkylaryl (e.g., tolyl, xylyl, ethylphenyl, etc.) halogenated aromatic and the like; the N-vinyl and allyl guanidines and including allyl melamine, allyl isomelamine and the like; the N-vinyl-N-alkylguanidines such as N-vinyl-N-n-butylguanidine, N-vinyl-N-benzyl guanidine, acryloguanamine, methacryloguanamine and the like; the N-vinyl monomers such as N-vinylpyrrole, N-vinyl carbazole, N-vinylindole, N-vinyl succinimide and the like; N-vinyl lactams such as N-vinyl caprolactam, N-vinyl butyrolactum and the like; the amides and substituted amides of acrylic acid and α and β-substituted acrylic acids such as acrylamide, methacrylamide, ethacrylamide, N-methacrylamide, N-methylmethacrylamide, N,N-bis (hydroxyethyl) acrylamide, N,N-diethylacrylamide, N,N-ethylmethylacrylamide and other mono- and di- N substituted unsaturated acid amides where the substituent is $C_1$ to $C_5$ alkyl alkoxy, haloalkyl and the like; the olefinic nitriles such as acrylonitrile, methacrylonitrile, ethacrylonitrile, chloroacrylonitrile and the like; the fluoro-substituted nitriles of olefinic acids such as N-(2,2,3-trifluoroethyl) acrylamide, methacrylamide, N-(2,2-difluoroethyl) acrylamide and methacrylamide; the acylamino substituted acrylic and α and β-acrylic acid esters such as the methyl, ethyl, propyl and the like alkyl esters of α-acetoaminoacrylate, α-N-butylaminoacrylate and the like; the vinyl pyridines such as 2-vinyl pyridine, 3-vinylpyridine, 4-vinylpyridine, 2-vinyl-5-ethylpyridine, 2-methyl-5-vinylpyridine and the other ethyl and methyl isomers of vinylpyridine and the like; the vinyl heterocyclic compounds such as 2-vinylfuran and 2-vinylthiophene and the like; the silicon containing monomers such as silicon tetraacrylate, silicon tetra-methacrylate, vinyltrichlorosilane and its hydrolysis products, the vinyl and allyl silicates and the like; the phosphorus containing monomers such as acrylic esters containing phosphonamido groups such as diamidophosphoroacrylate and the like and other similar polymerizable materials having a polymerizable unsaturated carbon-to-carbon bond; the olefinic acids and their derivatives such as acrylic acid and the alpha and/or beta alkyl, aryl, and alkaryl substituted acrylic acides such as the methyl, ethyl, propyl, butyl, isobutyl, phenyl, tolyl and the like alpha and/or beta substituted acrylic acids including α-methacrylic acid, α-ethacrylic acid, α-propylacrylic acid, α-butylacrylic acid and α-phenylacrylic acid, and the like, and further including the oxy, hydroxy and halogen, including the fluoro, chloro, and bromo derivatives of these olefinic acids and substituted olefinic acids and the like; the half alkenyl esters of saturated dicarboxylic acids such as the vinyl, vinylidene and allyl half ester of such saturated dicarboxylic acids as oxalic, malonic, succinic, glutaric, adipic, tartaric, citric, phthalic and the like; the olefinic dicarboxylic and their acid anhydrides and the half alkyl, aryl or alkaryl esters of olefinic dicarboxylic acids such as maleic, citraconic, itaconic, mesaconic, fumaric, muconic and similar acids including their acid anhydrides such as maleic anhydride and the like and the alkyl and aryl half esters of these olefinic dicarboxylic acids like monoethyl fumarate, monomethyl itaconate and the halo-derivatives of these such as chloromaleic anhydride; the olefinic nitrile and other polymerizable olefinic nitriles and these can be polymerized and can then have their cyano groups converted to carboxyl groups by saponification with a strong alkali such as sodium hydroxide or potassium hydroxide; monomers having a plurality of polymerizable unsaturated carbon-to-carbon bonds at least two of which are non-conjugated, and include: the polyunsaturated esters of olefinic alcohols and unsaturated mono-carboxylic acids such as the vinyl, vinylidene, and allyl, methallyl, crotyl, 1-chloroallyl, 2-chloroally, cinnamyl, methyl vinyl, 1-phenyl allyl, butenyl esters of unsaturated monocarboxylic acids such as vinyl acrylate, allyl acrylate, the vinyl and allyl esters of $\alpha$ and $\beta$ substituted acrylates such as vinyl methacrylate, vinyl crotonate, vinyl ethacrylate, allyl methacrylate, allyl ethacrylate, vinyl $\alpha$-chloroacrylate, allyl $\alpha$-hydroxyethyl acrylate, and the like; the polyunsaturated esters of saturated dicarboxylic and polycarboxylic acids such as the vinyl, vinylidene, allyl, methallyl, crotyl, 1-chloroallyl, 2-chloroallyl, cinnamyl, methyl vinyl, 1-phenyl allyl, butenyl esters and mixed esters of such dicarboxylic acids as oxalic, malonic, succinic, glutaric, adipic, tartaric, citric, and the like including such monomers as diallyl oxylate, diallyl sebacate, diallyl adipate, diallyl succinate, diallyl malonate, triallyl citrate and the like; polyunsaturated esters of unsaturated polycarboxylic acids, such as the vinyl, vinylidene, allyl, ethallyl, crotyl, 1-chloroallyl, 2-chloroallyl, cinnamyl, methyl vinyl, 1-phenyl allyl, butenyl esters and mixed esters of the unsaturated polycarboxylic acids such as maleic, citraconic itaconic, mesaconic, fumaric, muconic, chloromaleic, aconitic and the like including such monomers as diallyl fumarate, diallyl homophthalate, diallyl itaconate, diallyl ester of muconic acid, diallyl maleate, diallyl phthalate, diallyl isophthalate, diallyl terephthalate, triallyl aconitate and the like; polyhydroxy esters of unsaturated acids such as the glycol esters, glycol ether esters, the trihydroxy-, tetrahydroxy-, pentahydroxy-, hexahydroxy- esters including the glycerides, the pentoses, the hexoses esters of acrylic acid and $\alpha$ and $\beta$-substituted acrylic acid such as ethylene diacrylate, ethylene dimethacrylate, propylene dimethacrylate, glycerol dimethacrylate, glyceryl trimethacrylate, tetramethylene diacrylate and dimethacrylate, tetraethylene glycol dimethacrylate and the like: anhydrides of unsaturated acids such as acrylic anhydride, methacrylic anhydride and the like; polyunsaturated acid amides such as N,N-diallyl acrylamide, N,N-diallyl methacrylamide, N,N-methylene bisacrylamide and the like; polyunsaturated ethers such as divinyl ether, diallyl ether, divinyl carbitol, divinyl ether of diethylene glycol and the like; polyunsaturated triazines, the diallyl cyanurate, N,N-diallyl melamine, 2,4-diallyloxy-6-amino-5-triazine, the di- and tri- vinyl cyanurates and derivatives of these and the like; other polyunsaturated nitrogen derivatives such as diallyl amine, diallyl cyanamide and the like; polyunsaturated phosphorus acid esters such as triallylphosphate, diallyl benzenephosphonate, trimethallylphosphate and the like; polyunsaturated organo silicates, such as triallyl silicate, divinyl dichlorosilane and the like; the polyalkene aryl compounds and derivatives including the polyvinyl-, polyvinylidene- and polyallyl aryl compounds, such as divinylbenzenes, trivinylbenzenes, divinyltoluenes, trivinyltoluenes, divinylxylenes, divinyl ethyl benzenes, divinyl biphenyls and divinyl biphenyl oxides, divinylnaphthalenes, divinyl methylnaphthalenes, and derivates of these including those with alkyl, alkoxy, phenoxy, acetyl, isocyano, amino, nitrile, trifluoro methyl, and halo (F, Cl, Br) groups and the like; unsaturated half esters of unsaturated dicarboxylic acids including the vinyl, vinylidene and allyl half esters of the unsaturated dicarboxylic acids such as maleic, citraconic, itaconic, mesaconic, fumaric, muconic, chloromaleic, aconitic and the like, such as mono-allyl maleic acid, mono-vinyl itaconic acid and the like, and other monomers containing a carboxyl group and plurality of unsaturated double bonds. When the monomer materials are readily oxidized by hydrogen peroxide then such monomers may have to be employed sparingly.

MUTUAL SOLVENT-DILUENTS

The liquid organic mutual solvent-diluent for said hydrogen peroxide, monomer material, drying oil substance and any water present therewith comprises at lease one compound having not more than 6 carbon atoms and containing at least one group selected from the class consisting of carbinol, keto and ether groups and combinations thereof. The especially suitable alcohols are methanol, ethanol, n-propanol, isopropanol, tert.-butanol and the less suitable alcohols are n-butanol, isobutanol, sec.-butanol, ethylene glycol, propylene glycol, glycerol, 1-3-butanediol, furfuryl alcohol, tetrahydrofurfuryl alcohol and the like. The ketones which may be used include: acetone, methyl ethyl ketone, diacetone alcohol and the like. For further alcohol-ethers see ethers. The ethers include tetrahydrofuran, tetrahydropyran, 1,4-dioxane, carbitol acetate, methoxy triglycol acetate, 2-methoxyethanol, 2-methoxy-2-propanol, 2-ethoxyethanol, 1-ethoxy-2-propanol, methoxy-methoxyethanol, 2-(2-methoxyethoxy)ethanol, 2-(2-ethoxyethoxy)ethanol, and the like. Furthermore the mutual solvents may be used in combinations with each other and with other diluents as set forth heretofore especially in azeotropic mixtures, preferably those in which the mutual solvent-diluent predominates, e.g., methanol/2-butanone 70/30, methanol/1,2-dimethoxyethylene 90/10, methanol/toluene 69/31, ethanol/1,1-dichloropropane 53/47, ethanol/perchloroethylene 61/19, ethanol/toluene 68/32, isopropanol/tetrachloroethylene 81/29, isopropanol/toluene 69/31, n-propanol/toluene 52.5/47.5, and the like. Also there may be employed aqueous azeotropes of the mutual solvent-diluent and such azeotropes may be economically recovered and recycled. Where the mutual solvent-diluent is to be removed from the polymer product then those solvents with low boiling points are desirable and when such solvent is not to be removed, or only partially removed, then those solvents with high boiling points may be employed.

CONDITIONS

As above indicated the reactions hereof are conducted in liquid phase at sufficiently elevated temperatures above 100°C., preferably above 110°C., to form product with a number average molecular weight in the range of 500 to 10,000, with or without a vapor space depending on whether the reactions are conducted batchwise or continuously. At these temperatures the containing vessel may be subject to considerable pressure, e.g., 300–500 psi. for butadiene-1,3 polymerization, and for other more volatile materials employable in accordance with this invention the pressures may range upward to several thousand pounds per square inch, e.g., 5,000 to 8,000 p.s.i. As all of these polymerization reactions are exothermic, it is important that the reaction systems chosen have adequate heat transfer in order to avoid run-away reactions. The time of polymerization may vary with the materials and temperatures employed, and may range from about ½ hour to 5 hours or more, a time of from 1 to 3 hours usually being sufficient to obtain an adequate conversion of monomers at selected temperatures, as illustrated in the adjoined examples. Control of the aging of the unsaturated polymer product in the presence of the residual or added hydrogen peroxide and/or mutual solvent before or after stripping of the monomers and/or solvents, which may be expedited by heating, effects control of the oxygen content, more particularly the hydroxyl content, of the polymer product. Thus a significant part, e.g., 2 percent or preferably 10 percent or more of the groups of the polymer other than the interpolymerized monomer and drying oil material therein may be groups other than the two terminal groups of the polymer.

As typical of stripping procedures for separating the volatiles from the interpolymer products, vacuum and heat were employed, with or without steam, in the examples, and such typical procedures are exemplary of any suitable way of recovering the polymerization products.

EXAMPLES 1 THROUGH 6

Examples 1 through 6, Table I, illustrate how drying oil substances, exemplified by various drying oils, may be interpolymerized with ethylenically unsaturated monomer material, e.g., with the aid of hydrogen peroxide and mutual solvent-diluent. The terms drying oil and drying oil substances as here used are defined as hereinbefore set forth. In these examples the styrene may be replaced in whole or in part by other monomer material, e.g., by vinylidene monomers (including vinyl monomers), by diene monomers (including conjugated diene monomers), and by mixtures of the foregoing.

For tabulation of the ingredients employed, polymerization conditions and polymer yields for examples 1 through 6 see Table I hereinafter.

TABLE I

| | Interpolymer Comprising Drying Oil | | | | | |
|---|---|---|---|---|---|---|
| | (Parts by Wt.) | | | | | |
| Example No. | 1 | 2 | 3 | 4 | 5 | 6 |
| Drying Oil Substance | | | | | | |
| Oiticica oil, raw | 15 | | | | | |
| Tung oil, raw | | 15 | | | | |
| Linseed oil, raw | | | 15 | | | |
| Linseed oil, heat bodied[1] | | | | 15 | | |
| Soya bean oil, heat bodied[2] | | | | | 15 | |
| Dehydrated castor oil[3] | | | | | | 15 |
| Ethylenically Unsaturated Monomer | | | | | | |
| Styrene | 10 | 10 | 10 | 10 | 10 | 10 |
| Mutual Solvent-Diluent | | | | | | |
| Methyl ethyl ketone | 25 | 25.8 | | 25 | 41 | [4] |
| Isopropanol | | | 25.2 | | | |
| Phases at Ambient Temperature (75°F.) | | | | | | |
| Number | 1 | 1 | 1 | 1 | 1 | 1 |
| Hydrogen Peroxide | | | | | | |
| 50% wt. Aqueous | 1.8 | 1.8 | 1.8 | 1.8 | 1.8 | 1.8 |
| Polymerization | | | | | | |
| Temp., °C. | 120 | 120 | 120 | 120 | 120 | 120 |
| Time, hrs. | 3 | 3 | 3 | 3 | 3 | 3 |
| Interpolymer | | | | | | |
| Yield | 19.4 | 19.9 | 19.8 | 23.9 | 21.7 | 21.8 |

[1] Alinco L-2 prepared by Archer-Daniels Midland Co., Minneapolis, Minnesota.
[2] OKO Soya M-25 prepared by Archer-Daniels Midland Co.
[3] Castung G-H prepared by the Baker Castor Oil Co., Bayonne, N. J.
[4] sufficient to produce single phase

Examples 7 through 18

As above noted the styrene in Examples 1–6 may be replaced by other monomers, e.g., by vinylidene monomers (including vinyl monomers), by diene monomers (including conjugated diene monomers), and by mixtures of the foregoing. Typical examples of such replacements are set forth in Examples 7 through 18 in Tables II and III hereinafter, which tabulate the materials and polymerization conditions employed, and the yields obtained.

TABLE II

Interpolymer Comprising Drying Oil
(Parts by wt.)

| Example No. | 7 | 8 | 9 | 10 | 11 | 12 |
|---|---|---|---|---|---|---|
| Drying Oil Substance | | | | | | |
| Tung oil fatty acids | 40 | | | | | |
| Oiticica oil | | 10 | | | | |
| Isano oil | | | 3 | | | |
| Tung oil-oxidized[1] | | | | 9 | | |
| Blown soya oil | | | | | 75 | |
| Linseed oil[2] | | | | | | 8 |
| Ethylenically Unsaturated Monomer | | | | | | |
| Butadiene — 1,3 | 60 | 90 | 97 | 91 | | 59 |
| Acrylonitrile | | | | | 25 | |
| Styrene | | | | | | 25 |
| Mutual Solvent-Diluent | | | | | | |
| Methyl ethyl ketone | 35 | | | | | |
| Isopropanol | | 35 | 35 | 35 | 35 | 35 |
| Hydrogen Peroxide | | | | | | |
| 50% Aqueous | 4 | 6 | 6 | 6 | 6 | 6 |
| Phases at Ambient Temperture (75°F.) | | | | | | |
| Number | 1 | 1 | 1 | 1 | 1 | 1 |
| Polymerization | | | | | | |
| Temp. °C. | 130 | 130 | 130 | 130 | 130 | 130 |
| Time, hrs. | 5.5 | 3 | 2.5 | 2 | 2 | 3.5 |
| Interpolymer | | | | | | |
| Yield | 58 | 78 | 61 | 69 | 64 | 68.5 |
| Viscosity, poises* | 460 | 1750 | 195 | 193 | — | — |

*At 30°C.

[1] Oxidation of tung oil was carried out as follows: parts by wt. 9 tung oil dissolved in 35 isopropanol, 0.00022 phosphoric acid, 0.0009 of 6% cobalt Nuodex reaction conditions 3 hrs. at 112°C. and 160 psi oxygen pressure, to produce an oxidized tung oil having 6.26% titratable peroxide as $H_2O_2$.
[2] Linseed oil heat bodied to "Z" viscosity.

TABLE III

Interpolymer Comprising Drying Oil
(Parts by wt.)

| Example No. | 13 | 14 | 15 | 16 | 17 | 18 |
|---|---|---|---|---|---|---|
| Drying Oil Substance | | | | | | |
| Oiticica oil | 16 | | | | | |
| Soya oil - air blown[1] | | 15 | | | | |
| Dehydrated castor oil | | | 20 | | | |
| Dehydrated castor oil fatty acids | | | | 20 | | |
| Isano oil | | | | | | 5 |
| Linseed oil | | | | | | 10 |
| Safflower fatty acids | | | | | 80 | |
| Ethylenically Unsaturated Monomer | | | | | | |
| Styrene | 25 | 25 | | | | 25 |
| Butadiene-1,3 | 59 | 60 | 55 | 80 | 20 | 60 |
| Vinyl toluene | | | 25 | | | |
| Mutual Solvent-Diluent | | | | | | |
| Isopropanol | 35 | 35 | 35 | 35 | 35 | 35 |
| Hydrogen Peroxide | | | | | | |
| 50% aqueous | 6 | 6 | 6 | 6 | 6 | 6 |
| Phases at Ambient Temperature (75°F.) | | | | | | |
| Number | 1 | 1 | 1 | 1 | 1 | 1 |
| Polymerization | | | | | | |
| Temp. °C. | 120 | 120 | 118 | 118 | 118 | 118 |
| Time hrs. | 3.5 | 3.5 | 5 | 4 | 4 | 5 |
| Interpolymer | | | | | | |
| Yield | 65.2 | 62.5 | 75 | 61 | 63 | 60 |

[1] Heavy bodied air blown soya oil

EXAMPLES 19 through 38

Table IV set forth in summary fashion additional examples of the formation of drying oil substance interpolymers of diene and diene/vinylidene monomers, according to the recipe set forth in the caption and in the proportions and under the conditions set forth in Table IV, from a polymerization system having one single phase at ambient temperature (75°F.)

TABLE IV

Polymerization - From One Single Phase System

Recipe: 6 wt. pts. 50% Aqueous $H_2O_2$, 35 wt. pts. isopropanol, 100 wt. pts. monomer plus drying oil material

| Ex. No. | Monomers and Drying Oil Substances | Wt. Ratio | Polymerization °C./Hrs. | Yield Wt. % | Interpolymer Viscosity (Poises) |
|---|---|---|---|---|---|
| 19 | BD/VT/Tung | 55/25/20 | 118/5 | 50 | — |
| 20 | Bd/S/Isano | 65/25/10 | 118/3.5 | 46 | 2860 |
| 21 | Bd/S/Tung | 65/25/10 | 118/5 | 59 | 764 |
| 22 | Bd/S/Lin. | 60/25/15 | 118/5 | 30 | — |
| 23 | Bd/S/Blown Lin. | 60/25/15 | 118/5 | 68 | 498 |
| 24 | Bd/S/Soya bodied Z-1 | 60/25/15 | 118/5 | 69 | 464 |
| 25 | Bd/S/Blown Soya | 60/25/15 | 118/5 | 66 | 608 |
| 26 | Bd/S/Conj. Saf. | 60/25/15 | 118/5 | 66 | 249 |
| 27 | Bd/S/Isano | 70/25/5 | 118/5 | 50 | 1258 |
| 28 | Bd/S/Conj.Lin. | 60/25/15 | 118/5 | 60 | — |
| 29 | Bd/Isoline FA | 80/20 | 118/4.3 | 61 | — |
| 30 | Bd/Linseed FA | 80/20 | 118/4 | 39 | — |
| 31 | Bd/Soya FA | 80/20 | 118/4 | 66 | — |
| 32 | Bd/Saf.FA | 80/20 | 118/4 | 63 | — |
| 33 | Bd/Tung FA | 80/20 | 118/6 | 62 | — |
| 34 | Bd/Isano | 96/4 | 118/5 | 61 | — |
| 35 | Bd/Conj. FA | 80/20 | 118/4 | 61 | — |
| 36 | Bd/Isoline GH | 80/20 | 118/4 | 69 | — |
| 37 | Bd/S/Oit. | 70/25/5 | 122/3 | 61 | — |
| 38 | Bd/S/Oit. | 60/25/15 | 122/3 | 66 | — |

Conj. = Conjugated
FA = Fatty acids
BD = Butadiene-1,3
VT = Vinyl toluene
S = Styrene
Tung = Tung oil
Isano = Isano oil
Lin. = Raw linseed oil
Soya = Soya bean oil
Saf. = Safflower oil
Oit. = Oiticica oil
Isoline GH = A tradename for dehydrated castor oil

EXAMPLES 39 through 50

Tables V, VI and VII set forth further examples of the formation of drying oil substance interpolymers with various mutual solvent-diluents, from polymerization systems having one single phase at ambient temperature (75°F.).

TABLE V

Polymerization From One Single Phase System (Parts by Wt.)

| Example No. | 39 | 40 | 41 | 42 |
|---|---|---|---|---|
| Drying Oil Substance | | | | |
| Isano Oil | 2 | | | |
| Bodied Linseed Oil[1] | | 3 | | |
| Raw Linseed | | | 2 | |
| Tung oil FA | | | | 2 |
| Benzene | | | | 10 |
| Ethylenically Unsaturated Monomer | | | | |
| Styrene | 25 | 30 | | |
| Methyl methacrylate | | | 35 | |
| Cyclohexyl methacrylate | | | | 30 |
| Mutual Solvent-Diluent | | | | |
| Furfuryl alcohol | — | 17.3 | | |
| n-propanol | 13.3 | — | 11.5 | |
| Methanol | | | | 21 |
| Hydrogen Peroxide | | | | |
| 50% Aqueous | 2 | 2 | 3 | 2 |
| Phases at Ambient Temperature (75°F.) | | | | |
| Number | 1 | 1 | 1 | 1 |
| Polymerization | | | | |
| Temp., °C. | 135 | 135 | 135 | 138 |
| Time, hrs. | 3 | 3 | 2.5 | 2.5 |
| Interpolymer | | | | |
| Yield, wt. | 25 | 24.5 | 32.5 | 32 |
| Yield, % | 92.6 | 74.2 | 87.8 | 100 |
| Viscosity, Gardner | >Z-10 | >Z-10 | >Z-10 | >Z-10 |
| Color, Gardner | 10 | 14 | 9 | 14 |

[1] Trademark product Crystal Z-3

TABLE VI

Polymerization from One Single Phase System

| Example No. | 43 | 44 | 45 | 46 |
|---|---|---|---|---|
| Drying Oil Substance | | | | |
| Raw tung oil | 1 | | 1 | |
| Oiticica FA | | 1 | | |
| Oiticica oil (16.7% in benzene) | | | | 6 |
| Ethylenically Unsaturated Monomer | | | | |
| Butadiene-1,2 | 20 | 36.5 | 43 | |
| Acrylonitrile | 4 | | | |
| Styrene | | | 5 | 20 |
| Hydroxyethyl methacrylate | | | | 1 |
| Mutual Solvent-Diluent | | | | |
| Isopropanol | 10 | | | |
| Methanol | | 20 | | |
| Ethanol | | | 20 | |
| Isopropanol/water azeotrope[1] | | | | 7 |
| Hydrogen Peroxide | | | | |
| 50% Aqueous | | | | 3 |
| 35% Aqueous | 1.5 | 2 | 2 | |
| Phases at Ambient Temperature (75°F.) | | | | |
| Number | 1 | 1 | 1 | 1 |
| Polymerization | | | | |
| Temp., °C. | 126 | 126 | 126 | 133 |
| Time, hrs. | 4 | 3 | 3 | 3 |
| Interpolymer | | | | |
| Yield, wt. | 19.7 | 21.5 | 30.5 | 22.5 |
| Yield, % | 78.8 | 57.4 | 64.0 | 100 |
| Viscosity, Gardner | >Z-10 | >Z-10 | >Z-10 | solid |
| Color | Amber | Amber | WW* | WW* |

\* WW = water white
[1] Azeotrope composition 87.8% isopropanol and 12.2% water.

TABLE VII

Polymerization From One Single Phase System
(Parts by Wt.)

| Example No. | 47 | 48 | 49 | 50 |
|---|---|---|---|---|
| Drying Oil Substance | | | | |
| Blown Tung | 5 | | 3 | |
| Oiticica Oil (16.7% in benzene) | | 36 | | 13.8 |
| Ethylenically Unsaturated Monomer | | | | |
| Methyl methacrylate | 95 | | 50 | |
| Styrene | | 24 | | 40 |
| Acrylonitrile | | | | 10 |
| Mutual Solvent-Diluent | | | | |
| Methyl ethyl ketone | 93 | | | |
| t.-butanol | | 21 | | 24.6 |
| Tetrahydrofuran | | | 39.6 | |
| Methyl ethyl ketone | | | | 23.9 |
| Hydrogen Peroxide | | | | |
| 35% Aqueous | 15 | 3 | 7 | 8 |
| Phases at Ambient Temperature (75°F.) | | | | |
| Number | 1 | 1 | 1 | 1 |
| Polymerization | | | | |
| Temp., °C. | 133 | 130 | 130 | 135 |
| Time, hrs. | 3 | 6 | 6 | 3 |
| Interpolymer | | | | |
| Yield, wt. | 93 | 24.8 | 52. | 53. |
| Yield, % | 93 | 82.6 | 98 | 100. |
| Color | WW* | WW* | WW* | WW* |

\* WW = water white

Furthermore, when the polymers of this invention are formed from substantial proportions of monomers having salt forming groups which includes carboxyl and/or amine group-containing monomers and the like then such polymers may be converted to water dispersible or water soluble form by converting at least a part of said groups to water soluble salt.

The residual monomers, the selected single or mixed mutual solvent-diluent and the hydrogen peroxide can be removed with the aid of heat and vacuum. By adjusting the heat and vacuum the monomers and any water can first be removed and prior to removal of the selected single or mixed mutual solvent diluent or thereafter but prior to the total removal of the hydrogen peroxide, the unsaturated polymer composition can be heated so as to enhance the oxygen content of the unsaturated polymer. In addition to the removal of the residual hydrogen peroxide with the aid of heat and vacuum, such hydrogen peroxide may be destroyed chemically as by treating with formaldehyde when the viscosity and hydroxyl content of the liquid polymers has been adjusted to the desired values.

While there have been described herein what are at present considered preferred embodiments of the invention, it will be obvious to those skilled in the art that modifications and changes may be made without departing from the essence of the invention. It is therefore to be understood that the exemplary embodiments are illustrative and not retrictive to the invention, the scope of which is defined in the appended claims, and that all modifications that come within the meaning and range of equivalency of the claims are intended to be included therein.

We claim:
1. A polymer product characterized in that:
   a. said product is comprised essentially of polymer which has a number average molecular weight of not over about 10,000;
   b. said polymer is an interpolymer of
      1. from 5-95 parts by weight of drying oil substance selected from the class consisting of the drying oils, the air-blown or bodied drying oils, and the fatty acids derived from the foregoing, and dimers, trimers, and tetramers thereof, and
      2. from 95-5 parts by weight of polymerizable material selected to consist essentially of from 2 to 100 percent by weight of material having a water solubility at 20°C. of no more than 3.5 weight percent and from 0 to 98 percent by weight of material having a water solubility at 20°C. greater than 3.5 weight percent, and selected from the ethylenically unsaturated monomers that have and are polymerizable with the aid of hydrogen peroxide through at least one

group and contain not more than 14 carbon atoms,
   c. said polymer, in addition to the polymerized monomer material and drying oil substance therein, comprises substituent groups derived from its having been polymerized at temperatures in the range of above 100°C to about 200°C from the materials (1) and (2) in a solution of hydrogen peroxide in liquid organic mutual solvent-diluent for said hydrogen peroxide, monomer material, drying oil substance and any water present therewith, which liquid organic mutual solvent-diluent comprises at least one compound having not more than 6 carbon atoms and which contains at least one group selected from the class consisting of carbinol, keto and ether groups, and combinations thereof.

2. A product according to claim 1, wherein said polymer is an interpolymer of drying oil substance comprising essentially conjugated linseed oil.

3. A product according to claim 1, wherein said polymer is an interpolymer of drying oil substance comprising essentially dehydrated castor oil.

4. A product according to claim 1, wherein said polymer is an interpolymer of drying oil substance comprising essentially oiticica oil.

5. A product according to claim 1, wherein said polymer is an interpolymer of drying oil substance comprising essentially tung oil.

6. A product according to claim 1, wherein said polymer is an interpolymer of drying oil substance comprising essentially isano oil.

7. A method for forming polymer material having a number average molecular weight in the range of 500 to 10,000, which method comprises:
   a. forming a single phase polymerization system which consists essentially of a combination in solution of the following ingredients:
      1. from 5-95 parts by weight of drying oil substance selected from the class consisting of the drying oils, the air-blown or bodied drying oils, and the fatty acids derived from the foregoing, and dimers, trimers, and tetramers thereof,
      2. from 95-5 parts by weight of polymerizable monomer material selected to consist essentially of from 2 to 100 percent by weight of material having a water solubility at 20°C. of no more than 3.5 weight percent and from 0 to 98 percent by weight of material having a water solubility of 20°C. greater than 3.5 weight percent, and selected from the ethylenically unsaturated monomers that have and are polymerizable with the aid of hydrogen peroxide through at least one

group and contain not more than 14 carbon atoms,
      3. from 0.5 to 10 parts by weight of hydrogen peroxide per 100 parts by weight of said ingredients (1) and (2), and
      4. at least 5 parts by weight, per 100 parts by weight of ingredients (1) and (2), of liquid organic mutual solvent-diluent for said hydrogen peroxide, monomer material, drying oil substance and any water present therewith, which liquid organic mutual solvent-diluent comprises at least one compound having not more than 6 carbon atoms and which contains at least one group selected from the class consisting of carbinol, keto and ether groups and combinations thereof, and
   b. heating said combination, essentially in the absence of material which appreciably decomposes hydrogen peroxide to form oxygen, at sufficient temperatures in the range of above 100°C. to about 200°C. for sufficient time to form polymer material having a number average molecular weight in the range of 500 to 10,000 and containing groups derived from the solution of the hydrogen peroxide in said liquid organic mutual solvent-diluent.

8. A method according to claim 7, wherein said drying oil substance comprises essentially conjugated linseed oil.

9. A method according to claim 7, wherein said drying oil substance comprises essentially dehydrated caster oil.

10. A method according to claim 7, wherein said drying oil substance comprises essentially oiticica oil.

11. A method according to claim 7, wherein said drying oil substance comprises essentially tung oil.

12. A method according to claim 7, wherein said drying oil substance comprises essentially isano oil.

* * * * *